W. T. DONNELLY.
FLEXIBLE TRANSMITTING COUPLING.
APPLICATION FILED JUNE 14, 1912.
1,055,025.
Patented Mar. 4, 1913.
2 SHEETS—SHEET 1.
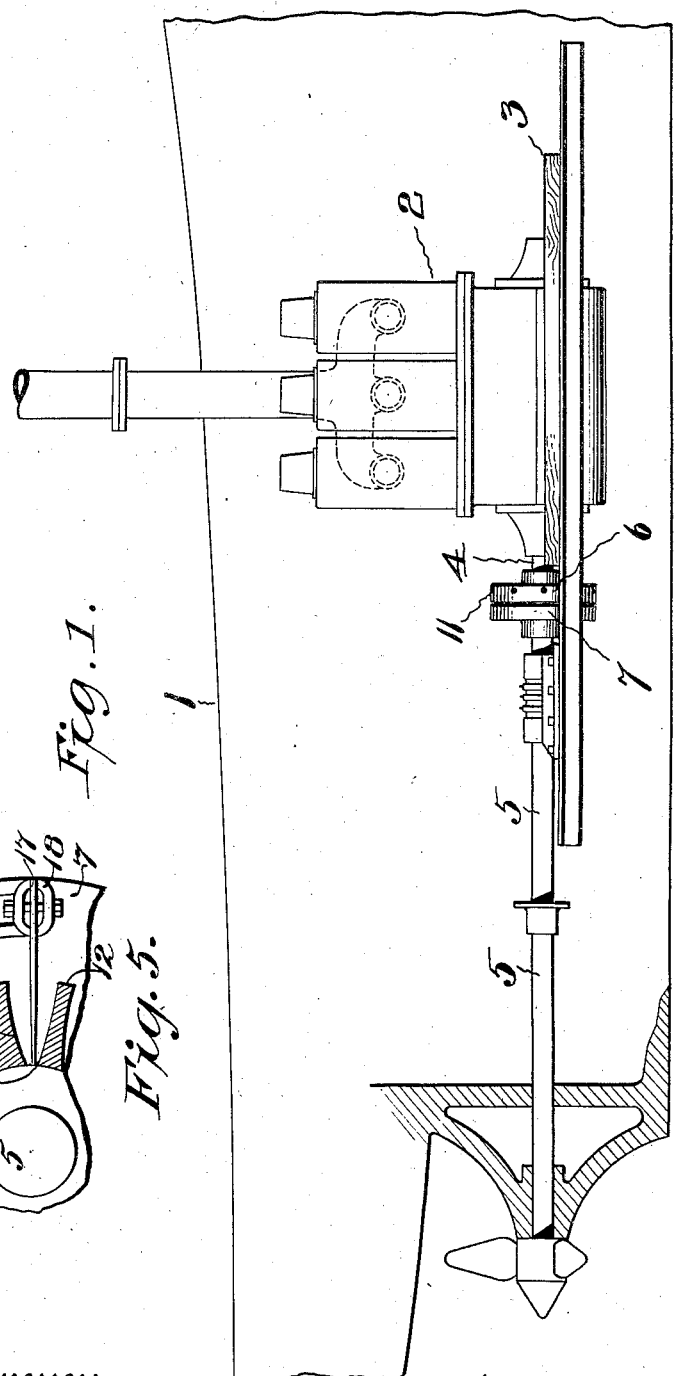
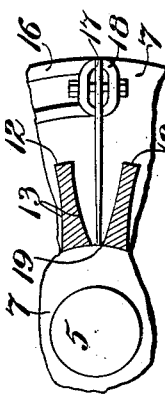
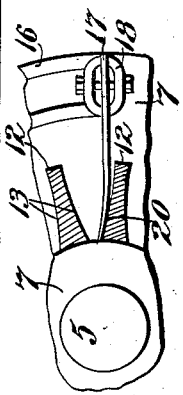
Witnesses:
A. R. Appleman
W. O. Blackwood
Inventor
William Thomas Donnelly
By his Attorneys
Blackwood Bros.

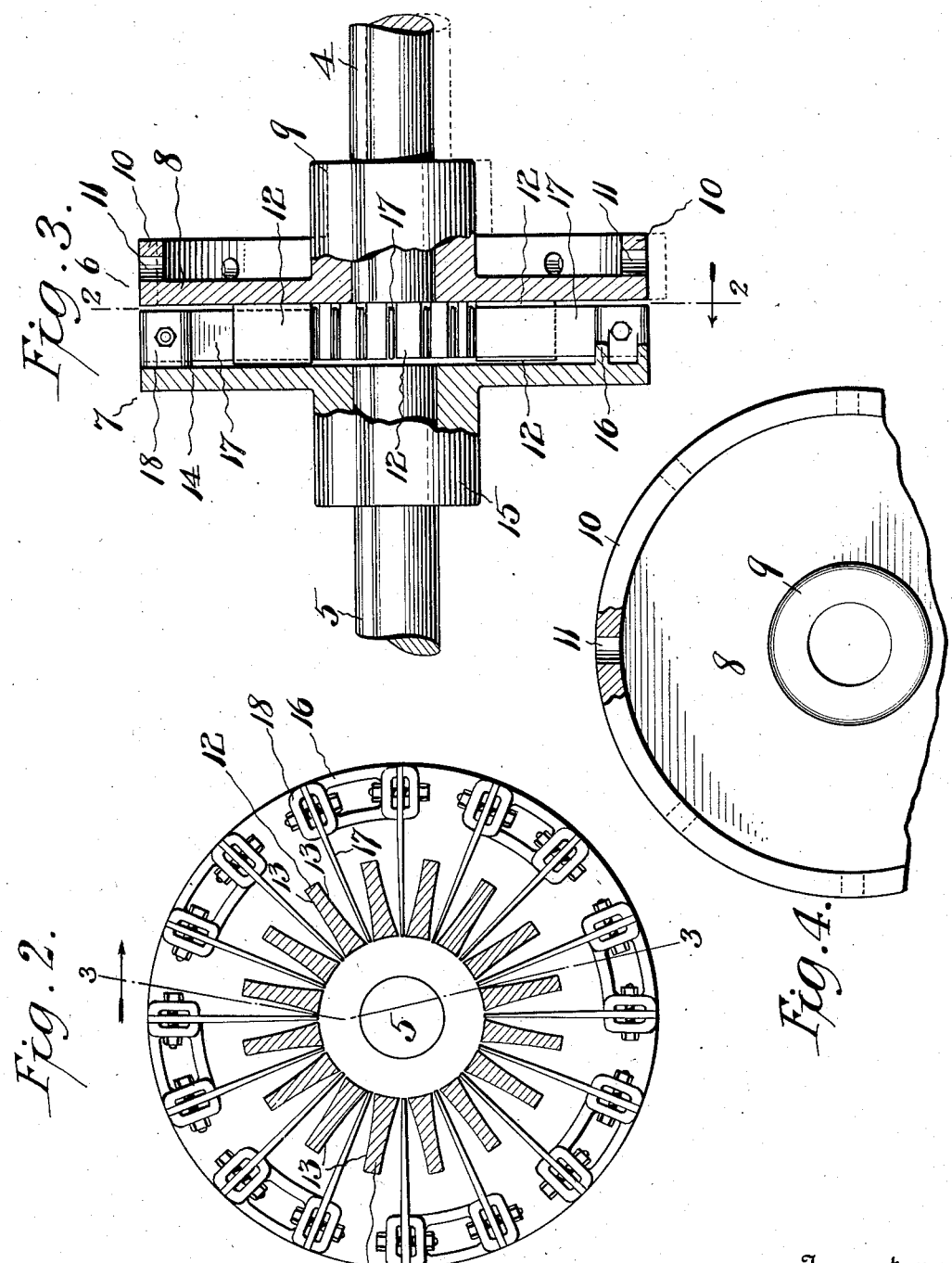

UNITED STATES PATENT OFFICE.

WILLIAM THOMAS DONNELLY, OF BROOKLYN, NEW YORK.

FLEXIBLE TRANSMITTING-COUPLING.

1,055,025. Specification of Letters Patent. Patented Mar. 4, 1913.

Application filed June 14, 1912. Serial No. 703,716.

*To all whom it may concern:*

Be it known that I, WILLIAM THOMAS DONNELLY, a citizen of the United States, residing at Brooklyn, in the county of Kings and State of New York, have invented certain new and useful Improvements in Flexible Transmitting-Couplings, of which the following is a specification.

My invention relates to flexible transmitting couplings.

It has for its object the construction of a flexible transmitting coupling in which the turning moment, in transmitting the power from one shaft to the other, is increased at a less proportion than the increase of power transmitted, this object being accomplished by constructing the device so that the point of application of the turning moment automatically increases in distance from the center as the load increases, thus reducing very largely the probability of fracture by sudden change in load.

It has for a further object the construction of a flexible transmitting coupling the operation of which is precisely similar in either direction.

It has for a still further object the construction of a flexible transmitting coupling, by which shafts may be connected out of alinement or in alinement with each other.

In the drawings: Figure 1 is a fragmentary sectional view of a ship, showing my flexible transmitting coupling connecting the drive shaft of an engine with the tail shaft on which the propeller is secured. Fig. 2, a sectional view of my flexible transmitting coupling, taken on the line 2—2 of Fig. 3. Fig. 3, a side view of my flexible transmitting coupling, partly broken away and in section. Fig. 4, a fragmentary end view of the driving member of my flexible transmitting coupling. Fig. 5, a fragmentary sectional view of my flexible transmitting coupling, showing the initial center of application of the turning moment, the tongue beginning to engage the curved surface of the lug. Fig. 6, a fragmentary sectional view of my flexible transmitting coupling, showing the center of application of the turning moment increased, the tongue partially engaging the curved surface of the lug. Fig. 7, a fragmentary sectional view of my flexible transmitting coupling, showing the final center of application of the turning moment, the tongue fully engaging the curved surface of the lug.

Referring to the drawings, in which like reference characters designate corresponding parts, 1 designates a ship having an engine 2 installed therein upon a platform 3, the drive shaft 4 of the engine being connected to the tail shaft 5, on which the propeller is secured, by means of my flexible transmitting coupling.

The flexible transmitting coupling is composed of members 6 and 7, the member 6, being shown in the drawings, secured on the drive shaft 4 of the engine and therefore, in this instance, constitutes the driving member of the coupling and the member 7, being shown in the drawings, secured on the tail shaft 5, on which the propeller is secured, and therefore, in this instance, constitutes the driven member of the coupling.

The member 6 of the flexible transmitting coupling comprises a disk 8 having on its outer face a hub 9, in which the drive shaft of the engine is secured, and a peripheral flange 10 provided with holes 11 for the insertion of a bar to turn said member and on its inner face the disk is provided with a circular series of lugs 12 spaced apart and tapered in a direction away from the axis of the disk, by beveling or curving their inner faces 13 in the direction mentioned.

The member 7 of the flexible transmitting coupling comprises a disk 14 having on its outer face a hub 15, in which the tail shaft of the propeller is secured, and peripheral frames 16 to which spring tongues 17 are secured by interposing their outer ends between the ends of said frames 16 and plates 18 and bolting said parts together. The spring tongues 17 are tapered toward their inner ends and are adapted to extend between the lugs 12 and connect the members of the flexible transmitting coupling together, with the drive shaft 4 and tail shaft 5 in alinement, or connect said shafts together out of alinement. When the shafts 4 and 5 are connected together in alinement, as shown by Figs. 1, 2 and 3 of the drawings, the inner ends of the spring tongues 17 will register with the inner ends of the lugs 12 and the disks 8 and 14 will be in alinement, and when the shafts 4 and 5 are connected together out of alinement, for instance as indicated in dotted lines on Fig. 3 of the drawings, the inner ends of some of the spring tongues 17 will project inwardly beyond the inner ends of the lugs 12 and the inner ends of other of the spring tongues 17 will extend short of the inner ends of the lugs 12 and the disks 8 and 14 will be out of alinement.

As a result of the shafts being connected together by my flexible transmitting coupling, described herein and shown by the accompanying drawings, upon the driving shaft 4 being started the member 6 of the flexible transmitting coupling, attached thereto, will rotate and the load will commence to be applied to the free ends of the spring tongues 17 by the driving member 6 of the flexible transmitting coupling, where its tangential velocity is relatively low, deflecting the spring tongues slightly, and the load will be gradually applied gradually deflecting the spring tongues 17 until the entire load is applied and as the spring tongues 17 are gradually deflected, by the gradually applied load, they gradually engage the curved faces 13 of the lugs 12 and when they contact with the entire curved surfaces of the lugs, the other member 7 of the flexible transmitting coupling will move with the driving member and revolve the tail shaft 5 and the propeller thereon, thus it will be seen that the center of the application of the turning moment automatically increases its distance from the center of rotation as the load increases, the initial center of the application of the turning moment (see Fig. 5) being at the point 19, increases (see Fig. 6) to the point 20 and finally increases (see Fig. 7) to the point 21.

I do not desire to be understood as limiting myself to the specific details of construction and arrangement as herein described and illustrated, as it is manifest that variations and modifications may be made in the features of construction and arrangement, in the adaptation of the device to various conditions of use, without departing from the spirit and scope of my invention and improvements. I therefore reserve the right to all such variations and modifications as properly fall within the scope of my invention and the terms of the following claims:

I claim:

1. A flexible transmitting coupling having rotatable members and spring means secured to one of said members and being free toward the center of rotation and engaging the other member, whereby the center of application of the turning moment automatically increases its distance from the center of rotation as the load increases, substantially as described.

2. A flexible transmitting coupling having rotatable members and spring means secured at the outer ends to one of said members and the inner end being free and extending toward the center of rotation and engaging the other member, whereby the center of application of the turning moment automatically increases its distance from the center of rotation as the load increases, substantially as described.

3. A flexible transmitting coupling having rotatable members and tapered spring means secured at the outer end to one of said members and the inner end being free and extending toward the center of rotation and engaging the other member, whereby the center of application of the turning moment automatically increases its distance from the center of rotation as the load increases, substantially as described.

4. A flexible transmitting coupling having a rotatable member provided with beveled faces, and a rotatable member provided with spring means secured at the outer end and the inner end being free and extending toward the center of rotation and engaging the beveled faces of the other member, whereby the center of application of the turning moment automatically increases its distance from the center of rotation as the load increases, substantially as described.

5. A flexible transmitting coupling having a rotatable member provided with lugs and a rotatable member provided with spring tongues secured at their outer ends and their inner ends being free and extending toward the center of rotation adapted to engage said lugs and operatively connect said members, whereby the center of the application of the turning moment automatically increases its distance from the center of rotation as the load increases, substantially as described.

6. A flexible transmitting coupling having a rotatable member provided with lugs having beveled faces and a rotatable member provided with spring tongues secured at their outer ends and their inner ends being free and extending toward the center of rotation adapted to engage the beveled faces of said lugs and operatively connect said members, whereby the center of the application of the turning moment automatically increases its distance from the center of rotation as the load increases, substantially as described.

7. A flexible transmitting coupling having a rotatable member provided with lugs and a rotatable member provided with tapered spring tongues secured at their outer ends and their inner ends being free and extending toward the center of rotation adapted to engage said lugs and operatively connect said members, whereby the center of the application of the turning moment automatically increases its distance from the center of rotation as the load increases, substantially as described.

8. A flexible transmitting coupling having a rotatable member provided with lugs and a rotatable member provided with spring tongues secured at their outer ends and their inner ends being free and extending toward the center of rotation adapted to engage said lugs and operatively connect said members, whereby the center of the application of the turning moment automatically increases its distance from the center of rotation as the load increases, substantially as described.

9. A flexible transmitting coupling having a rotatable member provided with lugs having beveled faces and tapered spring tongues secured at their outer ends and their inner ends being free and extending toward the center of rotation adapted to engage the beveled faces of said lugs and operatively connect said members, whereby the center of the application of the turning moment automatically increases its distance from the center of rotation as the load increases, substantially as described.

10. A flexible transmitting coupling having a member provided with lugs and a member provided with spring tongues secured at their outer ends and their inner ends being free and extending toward the center of rotation adapted to engage and slide between said lugs, substantially as described.

11. A flexible transmitting coupling having a member provided with lugs and a member provided with tapered spring tongues secured at their outer ends and their inner ends being free and extending toward the center of rotation adapted to engage and slide between said lugs, substantially as described.

12. A flexible transmitting coupling having a rotatable member provided with lugs having beveled faces and a rotatable member provided with tapered spring tongues secured at their outer ends and their inner ends being free and extending toward the center of rotation adapted to engage and slide between said lugs, substantially as described.

In testimony whereof I have signed my name in the presence of two subscribing witnesses.

WILLIAM THOMAS DONNELLY.

Witnesses:
GEORGE WEISENBAUM,
GUNNAR C. ENGSTRAND.